UNITED STATES PATENT OFFICE.

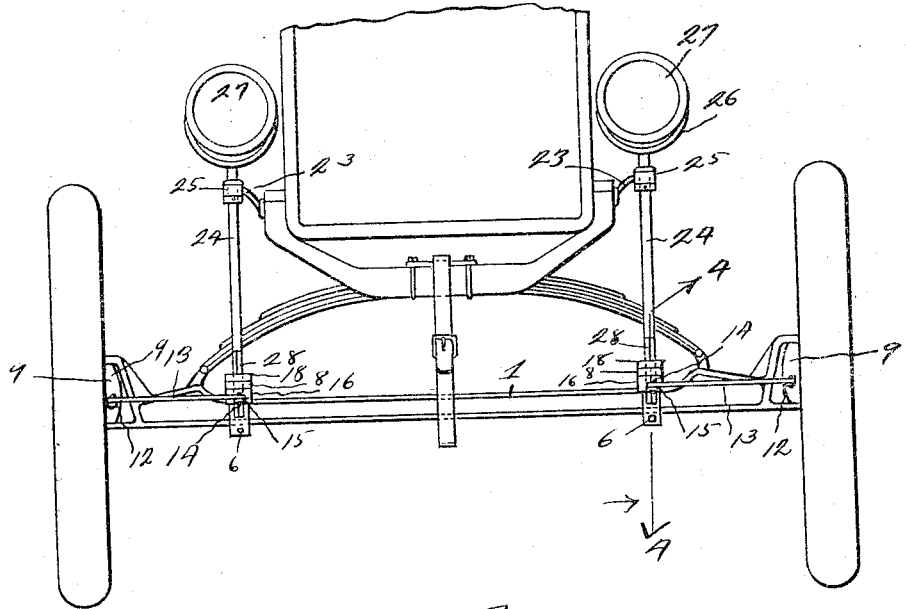
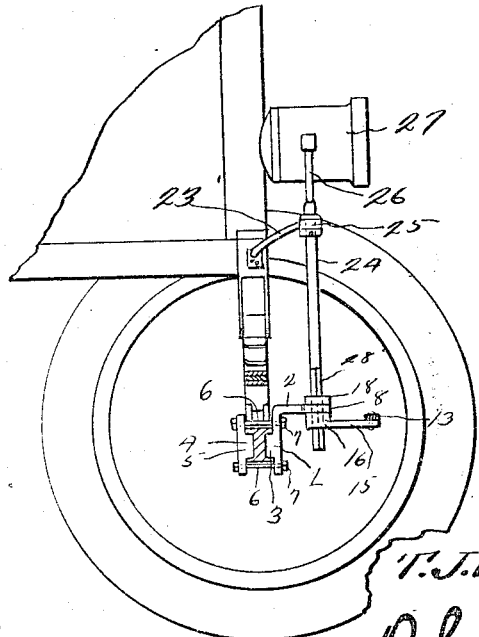

THOMAS J. WEAVER, OF LILY, COLORADO.

DIRIGIBLE-LAMP MECHANISM.

1,285,508.  Specification of Letters Patent.  Patented Nov. 19, 1918.

Application filed January 10, 1918. Serial No. 211,147.

*To all whom it may concern:*

Be it known that I, THOMAS J. WEAVER, a citizen of the United States, residing at Lily, in the county of Moffat, State of Colorado, have invented a new and useful Dirigible-Lamp Mechanism; and I do hereby declare the following to be a full, clear, and exact description of the invention, such as will enable others skilled in the art to which it appertains to make and use the same.

This invention relates to an improved dirigible lamp mechanism for automobiles, and one of the objects of the invention is to provide a mechanism of this kind comprising improved, efficient, simple and practical features of construction, whereby the head lights may be thrown correspondingly with the front wheels of the automobile.

One of the features of construction is the provision of the improved bracket to be clamped to and conforming with the front axle, said bracket having an arm, in which an arm is swiveled whereby it is provided with a rod connection with the knuckle joint of the front wheel. A further feature consists of a supporting rod for the lamp, said rod having a sliding and rocking connection with the swiveled end of said swiveled arm, whereby the front axle may accommodate itself to the irregularities of the road bed without affecting the lamps.

In practical fields the details of construction may necessitate alterations falling within the scope of what is claimed.

The invention comprises further features and combination of parts as hereinafter set forth shown in the drawings and claimed.

In the drawings:—

Figure 1 is a view in front elevation of an automobile showing the improved dirigible lamp mechanism applied.

Fig. 2 is a side view showing one of the front wheels removed and the front axle in section illustrating the lamp mechanism applied.

Fig. 3 is a detail perspective view of one of the lamps showing its supporting rod and the connections with the knuckle hub of the front wheel.

Figure 5:
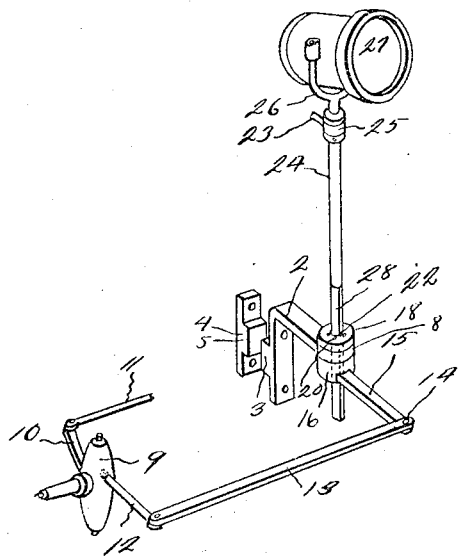
Figure 4:
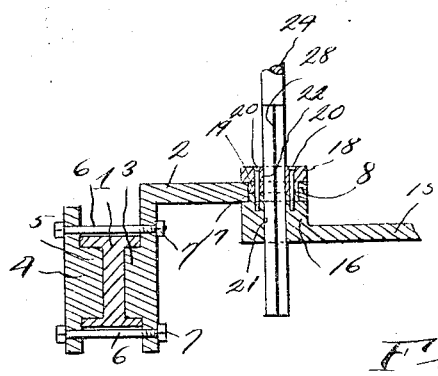
Fig. 4 is a sectional view on line 4—4 of Fig. 1.

Referring more especially to the drawings, 1 designates a front axle, and 2 a bracket, there being one adjacent each end portion of the axle. This bracket 2 is angular, and its vertical arm has an enlargement 3 fitting the channel of the axle, which is I-shaped in cross section. A clamping plate 4 is provided, and its enlargement 5 engages the channel of the rear part of the axle 1. Suitable bolts pass through the vertical arm of each bracket, and through the adjacent clamping plate. These bolts 6 are arranged, one above and one below the axle and have nuts 7. By this construction the brackets 2 are held rigidly on the axle, whereby their horizontal arms extend forwardly. The forward end of each horizontal arm has a circular opening 8. The knuckle hubs 9 of the front wheels are provided with the usual rearwardly extending arms 10, which are connected by the connecting rod 11. Said knuckle hubs have forwardly extending arms 12. Connected to the forward end of each arm 12 is a link 13, the inner end of which is pivoted at 14 to an arm 15. The rear end portion of each arm 15 terminates in a cylindrical enlargement 16. Each enlargement has a cylindrical extension 17 to fit the opening 8 of the horizontal arm of the bracket 2. A circular member 18 has a cylindrical extension 19 to also fit said opening 8 so as to engage the extension 17, there being screw bolts 20 passing through the member 18 and threaded into the enlargement 16 thereby swiveling the arm 15 on the horizontal arm of the bracket 2. The cylindrical enlargement 16 and the member 18 are provided with registering openings 21 and 22 rectangular in cross section. A suitable bracket 23 is secured upon each side of the radiator of the automobile and a supporting rod 24 is swiveled at 25 in each bracket 23. The upper ends of the rods 24 have forks 26, to which the lamps or headlights are connected. The lower ends of the rods 24 have extensions 28 rectangular in cross section, to fit the correspondingly shaped openings 21 and 22 of the enlargements 16 and the members 18 respectively, whereby said rods 24 may move vertically as the body of the automobile vibrates incident to the irregularities of the road bed. From the foregoing it is to be observed that as the front wheels turn in one direction or the other, the lamps or headlights will correspondingly move.

The invention having been set forth what is claimed as new and useful is:—

In a dirigible lamp mechanism, a bearing on the side of the frame of the automobile, a lamp supporting rod mounted in said bearing, the lower end of the rod having an extension rectangular in cross section, a bracket carried by the axle and having an opening at its forward end, an arm having an enlargement at its rear end provided with an extension fitting said opening, a member having a circular extension fitting said opening from above, means passing through the member and the enlargement for securing them swivelly in said opening, said enlargement and the member having rectangular openings through which said extension of said rod slidably passes, and means connecting said arm and the knuckle hub of one of the front wheels.

In testimony whereof I have signed my name to this specification in the presence of two subscribing witnesses.

THOMAS J. WEAVER.

Witnesses:
JOHN J. WEAVER,
JAMES W. SMITH.

Copies of this patent may be obtained for five cents each, by addressing the "Commissioner of Patents, Washington, D. C."